US012732250B2

(12) United States Patent
Zhu

(10) Patent No.: US 12,732,250 B2
(45) Date of Patent: Sep. 8, 2026

(54) CHANNEL STATE FEEDBACK METHOD AND APPARATUS

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 293 days.

(21) Appl. No.: 18/578,556

(22) PCT Filed: Jul. 12, 2021

(86) PCT No.: PCT/CN2021/105835

§ 371 (c)(1),
(2) Date: Jan. 11, 2024

(87) PCT Pub. No.: WO2023/283782

PCT Pub. Date: Jan. 19, 2023

(65) Prior Publication Data

US 2024/0297702 A1 Sep. 5, 2024

(51) Int. Cl.
*H04B 7/06* (2006.01)
*H04W 24/10* (2009.01)

(52) U.S. Cl.
CPC .......... *H04B 7/0626* (2013.01); *H04W 24/10* (2013.01)

(58) Field of Classification Search
CPC ..... H04B 7/0626; H04W 24/10; H04W 24/00
See application file for complete search history.

(56) References Cited

U.S. PATENT DOCUMENTS

| | | | | |
|---|---|---|---|---|
| 11,973,708 | B2 * | 4/2024 | Chavva | G06N 3/0464 |
| 12,348,287 | B2 * | 7/2025 | Wu | H04B 7/0641 |
| 2012/0250557 | A1 * | 10/2012 | Zirwas | H04W 72/542 370/252 |
| 2018/0175926 | A1 | 6/2018 | Rudrapatna | |
| 2020/0403668 | A1 | 12/2020 | Zhang et al. | |
| 2021/0013941 | A1 | 1/2021 | Sun et al. | |
| 2021/0105761 | A1 * | 4/2021 | Cheng | H04L 5/0053 |

FOREIGN PATENT DOCUMENTS

| | | | | |
|---|---|---|---|---|
| CN | 111492604 A | | 8/2020 | |
| CN | 112585888 A | | 3/2021 | |
| WO | WO 2020155119 A1 | | 8/2020 | |
| WO | WO-2020213964 A1 | * | 10/2020 | G06N 3/0464 |
| WO | WO 2021/018221 A1 | | 2/2021 | |
| WO | WO-2022236785 A1 | * | 11/2022 | H04L 1/00 |

OTHER PUBLICATIONS

International Search Report of International Application No. PCT/CN2021/105835, dated Mar. 28, 2022, 5 pages.

(Continued)

*Primary Examiner* — Cheikh T Ndiaye
(74) *Attorney, Agent, or Firm* — Finnegan, Henderson, Farabow, Garrett & Dunner, L.L.P.

(57) ABSTRACT

A method for channel state feedback is performed by a terminal device, and includes: sending predicted channel state information (CSI) to a network device at a first feedback moment.

10 Claims, 4 Drawing Sheets

(56) References Cited

OTHER PUBLICATIONS

3GPP TR 38.811 V15.4.0 (Sep. 2020); 3rd Generation Partnership Project; Technical Specification Group Radio Access Network; Study on New Radio (NR) to support non-terrestrial networks (Release 15).

3GPP TR 38.821 V16.2.0 (Mar. 2023); 3rd Generation Partnership Project; Technical Specification Group Radio Access Network; Solutions for NR to support non-terrestrial networks (NTN) (Release 16).

Huawei, HiSilicon, "Discussion on physical layer control procedures for Ntn", 3GPP TSG RAN WG1 Meeting #98bis, R1-1910063, Chongqing, China, Oct. 14-20, 2019, 4 pages.

Samsung, "Physical layer control procedures in NTN", 3GPP TSG RAN WG1 Meeting #99, R1-1912469, Reno, USA, Nov. 18-22, 2019, 5 pages.

The First Office Action for Chinese Application No. 202180002127.5, dated Jul. 16, 2025, 21 pages.

* cited by examiner

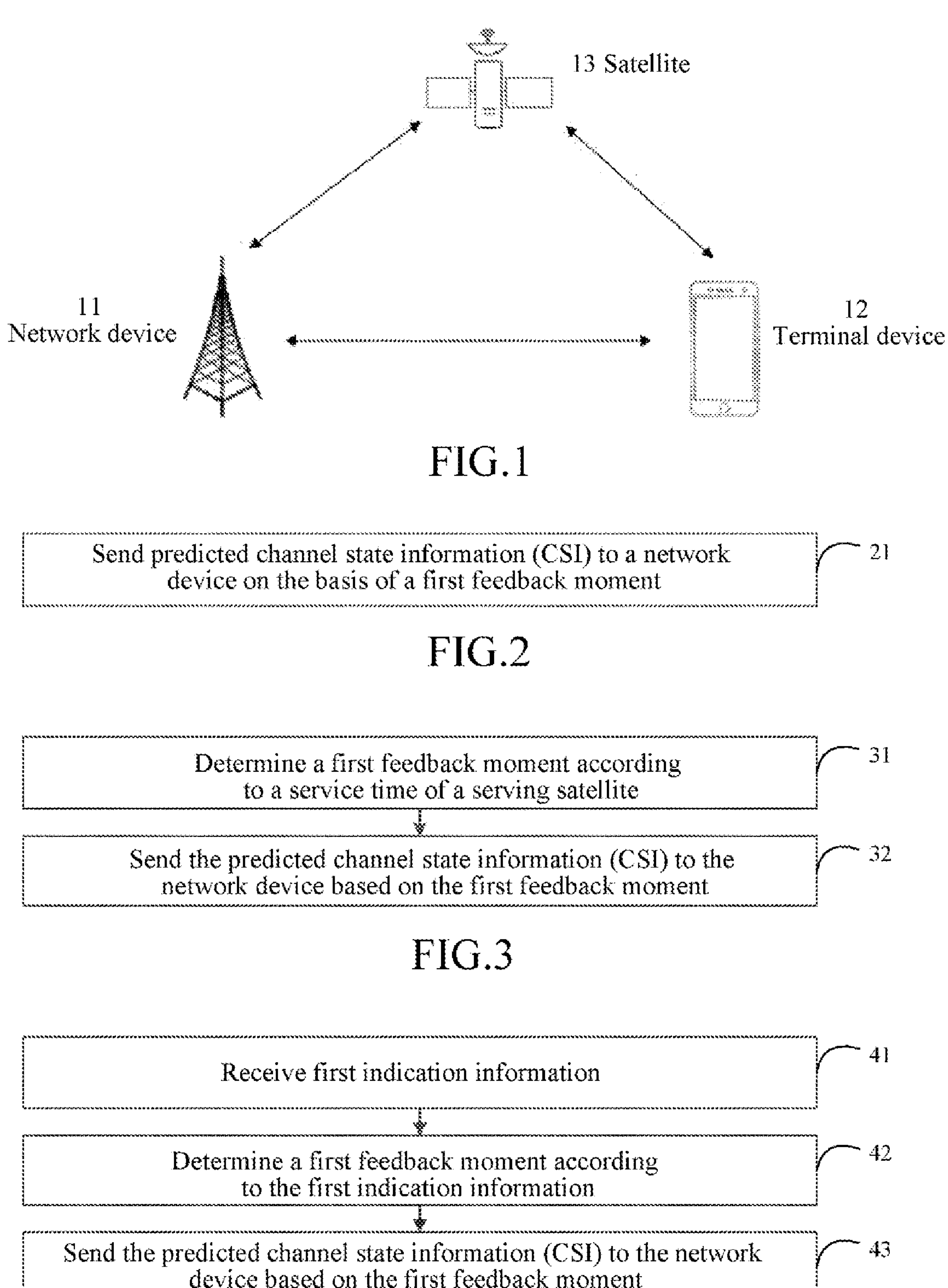
13 Satellite
11
Network device
12
Terminal device
FIG.1
Send predicted channel state information (CSI) to a network device on the basis of a first feedback moment
21
FIG.2
Determine a first feedback moment according to a service time of a serving satellite
31
Send the predicted channel state information (CSI) to the network device based on the first feedback moment
32
FIG.3
Receive first indication information
41
Determine a first feedback moment according to the first indication information
42
Send the predicted channel state information (CSI) to the network device based on the first feedback moment
43
FIG.4

CHANNEL STATE FEEDBACK METHOD AND APPARATUS

CROSS-REFERENCE TO RELATED APPLICATION

The application is a U.S. National Stage of International Application No. PCT/CN2021/105835 filed on Jul. 12, 2021, the entire content of which is incorporated herein by reference.

TECHNICAL FIELD

The present disclosure relates to the technical field of communication, and in particular, to a channel state feedback method and apparatus thereof.

BACKGROUND

At present, in the terrestrial communication system, the adaptive modulation and coding (AMC) function is supported, and the base station can flexibly adjust the transmission parameters through the channel state information (CSI) fed back by the terminal.

SUMMARY

Embodiments of the present disclosure provide a method and apparatus for channel state feedback, which can be applied in the technical field of communication.

In a first aspect, the embodiments of the present disclosure provide a channel state feedback method performed by a terminal device, and the method includes: sending predicted channel state information (CSI) to a network device at a first feedback moment.

In a second aspect, the embodiments of the present disclosure provide a channel state feedback method performed by a network device, and the method includes: receiving predicted channel state information (CSI) sent by a terminal device at a first feedback moment.

In a third aspect, the embodiments of the present disclosure provide a communication apparatus, the communication apparatus includes a processor and a memory, and a computer program is stored in the memory: when the computer program is executed by the processor, the communication apparatus executes the method described in the first aspect above.

In a fourth aspect, the embodiments of the present disclosure provide a communication apparatus, the communication apparatus includes a processor and a memory, and a computer program is stored in the memory: when the computer program is executed by the processor, the communication apparatus executes the method described in the second aspect above.

BRIEF DESCRIPTION OF THE DRAWINGS

The accompanying drawings of the present disclosure will be briefly described below.

FIG. 1 is a schematic diagram of an architecture of a communication system provided by an embodiment of the present disclosure;

FIG. 2 is a schematic flowchart of a method for channel state feedback provided by an embodiment of the present disclosure;

FIG. 3 is a schematic flowchart of a method for channel state feedback provided by another embodiment of the present disclosure:

FIG. 4 is a schematic flowchart of a method for channel state feedback provided by another embodiment of the present disclosure:

FIG. 4*a* is a schematic diagram of a trigger instruction provided by an embodiment of the present disclosure:

FIG. 5 is a schematic flowchart of a method for channel state feedback provided by another embodiment of the present disclosure:

FIG. 6 is a schematic flowchart of a method for channel state feedback provided by another embodiment of the present disclosure:

FIG. 7 is a schematic flowchart of a method for channel state feedback provided by another embodiment of the present disclosure;

DETAILED DESCRIPTION

Figure 8:
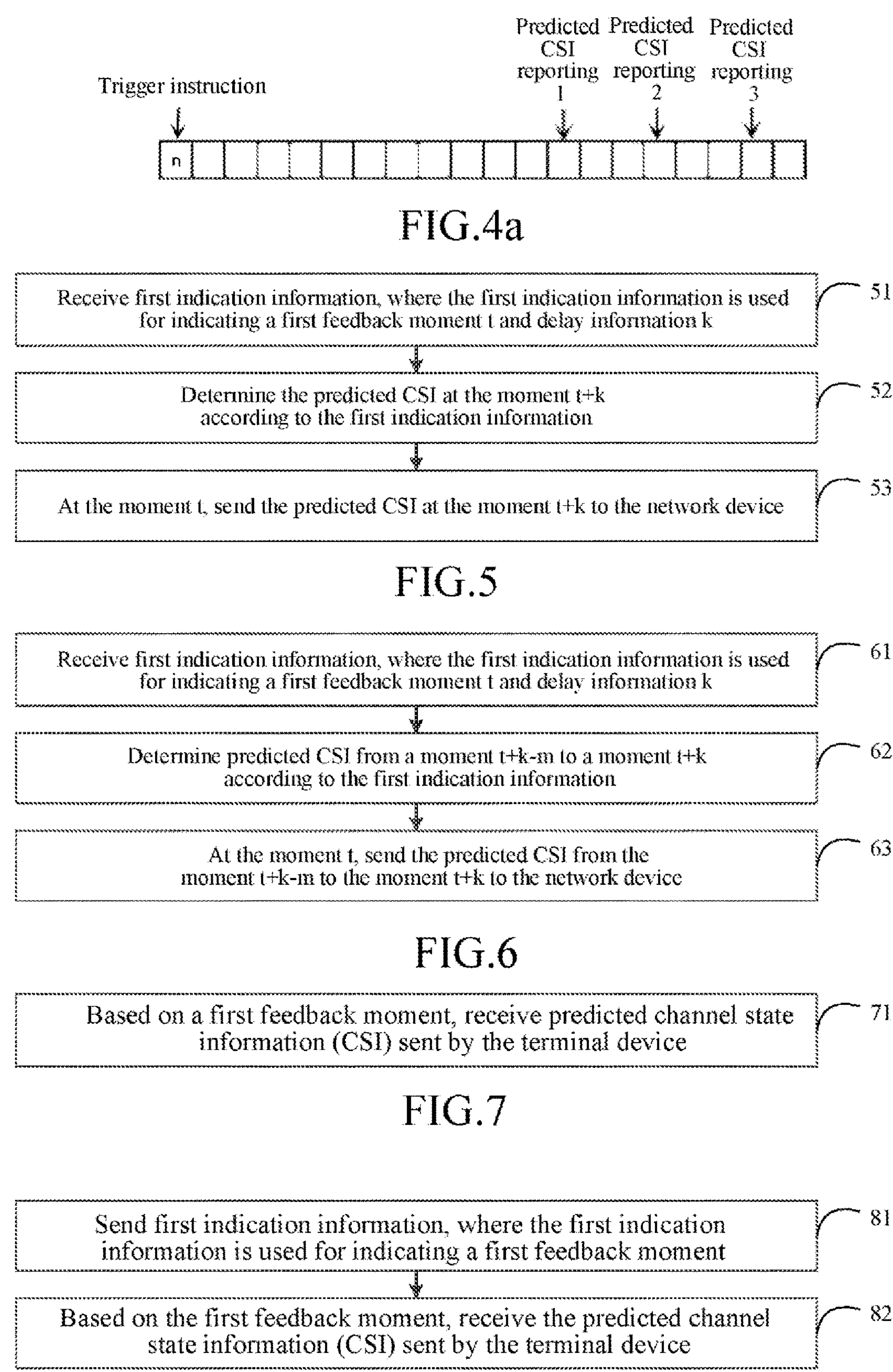
FIG. 8 is a schematic flowchart of a method for channel state feedback provided by another embodiment of the present disclosure.

For ease of understanding, the terms involved in the present disclosure are introduced first.

1. Channel State Information (CSI)

CSI is a channel attribute of the communication link. It describes the fading factor of the signal on each transmission path, that is, the value of each element in the channel gain matrix H, such as signal scattering (Scattering), environmental fading (fading, multipath fading or shadowing fading), distance attenuation (power decay of distance) and other information. CSI can make the communication system adapt to the current channel condition, and provides a guarantee for high-reliability and high-speed communication in a multi-antenna system.

In order to better understand the method for channel state feedback disclosed in the embodiments of the present disclosure, the communication system to which the embodiments of the present disclosure are applicable is firstly described below.

Reference is made to FIG. 1, which is a schematic diagram of an architecture of a communication system provided by an embodiment of the present disclosure. The communication system may include, but is not limited to, one network device, one terminal device, and one satellite. The number and form of the devices shown in FIG. 1 are only for example, and do not constitute a limitation to the embodiments of the present disclosure. In practical application, two or more network devices and two or more terminal devices may be included. The communication system shown in FIG. 1 includes one network device 11, one terminal device 12 and one satellite 13 as an example.

It should be noted that the technical solutions of the embodiments of the present disclosure may be applied to various communication systems, for example: a long term evolution (LTE) system, a fifth generation (5th generation, 5G) mobile communication system, a 5G new radio (NR) system, or other future new mobile communication systems, etc. The network device 11 in the embodiments of the present disclosure is an entity on the network side for transmitting or receiving signals. For example, the network device 11 may be an evolved base station (evolved NodeB, eNB), a transmission point (transmission reception point, TRP), a next generation base station (next generation NodeB, gNB) in the NR system, a base station in other future mobile communication systems or an access node in the wireless fidelity (WiFi) system, etc. The embodiments of the present disclosure do not limit the specific technology and specific device form adopted by the network device. The network device provided by the embodiments of the present disclosure may be composed of a central unit (CU) and a distributed unit (DU), where the CU may also be called a control unit. The structure of the CU-DU may separate the protocol layers of the network device, such as the base station, the functions of some protocol layers are placed in the CU to be centrally controlled, and the functions of the remaining part or all of the protocol layers are distributed in the DU, and the CU centrally controls the DU. The satellite provided in the embodiments of the present disclosure may be a low-orbit satellite, or may also be a high-orbit satellite, which is not limited in the present disclosure.

The terminal device 12 in the embodiments of the present disclosure is an entity on the user side for receiving or transmitting signals, such as a mobile phone. The terminal device may also be called a terminal device (terminal), user equipment (UE), a mobile station (MS), a mobile terminal device (mobile terminal, MT) and so on. The terminal device may be a car with communication functions, a smart car, a mobile phone, a wearable device, a tablet computer (Pad), a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal devices in smart grid, a wireless terminal devices in transportation safety, a wireless terminal device in smart city, a wireless terminal device in smart home, etc. The embodiments of the present disclosure do not limit the specific technology and specific device form adopted by the terminal device.

It can be understood that the communication system described in the embodiments of the present disclosure is to illustrate the technical solutions of the embodiments of the present disclosure more clearly, and does not constitute a limitation on the technical solutions provided by the embodiments of the present disclosure. As the person skilled in the art knows, with the evolution of the system architecture and the emergence of new service scenarios, the technical solutions provided by the embodiments of the present disclosure are also applicable to similar technical problems.

The method and apparatus for channel state feedback provided by the present disclosure will be described in detail below with reference to the accompanying drawings.

Reference is made to FIG. 2, which is a schematic flowchart of a method for channel state feedback provided by an embodiment of the present disclosure, and the method is executed by a terminal device. As shown in FIG. 2, the method may include but not limited to the following steps.

In step 21: predicted channel state information (CSI) is sent to a network device at a first feedback moment.

Optionally, the first feedback moment may be a feedback moment indicated by the network device, or may also be a feedback moment determined according to the agreement, or may also be a feedback moment determined after negotiation between the terminal device and the network device, etc., which is not limited by the present disclosure.

The predicted CSI is the CSI predicted by the terminal device at a certain moment in the future or for a period of time in the future.

Optionally, the terminal device may determine the predicted channel state information (CSI) based on a channel measurement result in a first time period before the first feedback moment.

The first time period may be a time period with a fixed or variable length and pre-configured by the terminal device, or may be a time period determined by the terminal according to received indication information from the network device, or may also be a time period determined after negotiation between the terminal device and the network device, which is not limited in the present disclosure.

It can be understood that, in the present disclosure, considering the problem of long transmission distance in the satellite communication system, the predicted CSI can be sent to the network device in advance, so as to ensure that the CSI received by the network device is available as much as possible, thereby ensuring reliable transmission of communication.

By implementing the embodiments of the present disclosure, the terminal device can send predicted channel state information (CSI) to the network device at the first feedback moment. Therefore, by sending the predicted CSI to the network device in advance, the situation that the CSI fed back by the terminal device is not available due to the transmission delay is avoided, thereby not only ensuring the validity and reliability of data transmission between the terminal device and the network device, but also reducing waste of resources.

Reference is made to FIG. 3, which is a schematic flowchart of a method for channel state feedback provided by an embodiment of the present disclosure, and the method is executed by a terminal device. As shown in FIG. 3, the method may include but not limited to the following steps.

In step 31: a first feedback moment is determined according to a service time of a serving satellite.

Optionally, the service time of the serving satellite may be a moment, a time period, or a remaining service time when the serving satellite can provide effective services for the terminal device.

In the present disclosure, the terminal device determines the first feedback moment according to the service time of the serving satellite. Therefore, it is ensured that within the service time of the serving satellite, the predicted CSI can be sent to the network device through the serving satellite. It should be noted that there may be one or more first feedback moments, which is not limited in the present disclosure.

Optionally, the terminal device may determine the service time of the serving satellite according to ephemeris data corresponding to the serving satellite.

The ephemeris data of the serving satellite may include position and velocity data of the serving satellite. According to the ephemeris data of the satellite, the terminal device can determine the position of the satellite at each moment, and then determine the feedback moment of the serving satellite based on the position of the satellite at each moment.

Optionally, the terminal device may also determine the service time of the serving satellite according to second indication information.

The second indication information is information sent by the network device to the terminal device and used for indicating the service time of the serving satellite.

In step 32: the predicted channel state information (CSI) is sent to the network device at the first feedback moment.

It should be noted that for the specific content and implementation manner of step 32, reference may be made to the descriptions of other embodiments of the present disclosure, which will not be repeated here.

By implementing the embodiments of the present disclosure, the terminal device may determine the first feedback moment according to the service time of the serving satellite, and then send the predicted channel state information (CSI) to the network device at the first feedback moment. Therefore, by sending the predicted CSI to the network device in advance, the situation that the CSI fed back by the terminal device is not available due to the transmission delay is avoided, thereby not only ensuring the validity and reliability of data transmission between the terminal device and the network device, but also reducing waste of resources.

Reference is made to FIG. 4, which is a schematic flowchart of a method for channel state feedback provided by an embodiment of the present disclosure, and the method is executed by a terminal device. As shown in FIG. 4, the method may include but not limited to the following steps.

In step 41: first indication information is received.

Optionally, the first indication information may be a radio resource control (RRC) message. The Radio Resource Control (RRC) message is sent by the network device to the terminal device, and is used for indicating the first feedback moment.

Optionally, the first indication information may also be a medium access control (MAC) control element (CE). The Medium Access Control (MAC) Control Element (CE) is sent by the network device to the terminal device, and is used for indicating the first feedback moment.

Optionally, the first indication information may also be downlink control information (DCI). The Downlink Control Information (DCI) is sent by the network device to the terminal device, and is used for indicating the first feedback moment.

The first indication information may include at least one of the following: a number of reporting of the CSI: a reporting cycle of the CSI: a reporting moment of the CSI; or delay information.

In step 42: a first feedback moment is determined according to the first indication information.

Optionally, if the first indication information is configuration information, the first feedback moment may be determined according to the number of reporting, the reporting cycle, the reporting moment and/or the delay information of CSI indicated by the configuration information.

Optionally, the number of reporting may be the number of times that the terminal device needs to feed back the predicted CSI to the network device within a predefined time after receiving the first indication information.

The reporting cycle may be a cycle for the terminal device to send the predicted CSI to the network device. The terminal device needs to send the predicted CSI to the network device every reporting cycle.

The delay information may be the delay existing when the terminal device sends information to the network device, that is, the terminal device sends a message to the network device at a moment $t_1$, and the CSI at moment $t_1+k$ is fed back. The delay information may be absolute delay information, or may be relative delay information. For example, the delay information indicated in the first indication information is k milliseconds, that is, when the terminal device sends information to the network device, the existing delay is k milliseconds. Alternatively, the first indication information may also indicate that the delay information is: m milliseconds later than the reporting moment, etc., which is not limited in the present disclosure.

The reporting moment may be the moment when the terminal device sends the predicted CSI to the network device.

For example, if the first indication information indicates: the delay information is k, and the reporting moment is t, then the terminal device can determine that the first feedback moment is t. That is, the terminal device needs to send the predicted CSI to the network device at the moment t, and the CSI at the moment t+k is fed back.

Optionally, if the first indication information is a trigger instruction, the terminal device may first receive the configuration information, and then determine the first feedback moment according to the receiving moment of the trigger instruction and the number of reporting, the reporting cycle, the reporting moment and/or the delay information indicated by the configuration information.

The trigger instruction is used to trigger the terminal device to report the predicted CSI. Therefore, the terminal device can determine the first feedback moment according to the number of reporting, the reporting cycle, the reporting moment and/or the time delay information indicated by the configuration information, at the moment when the trigger instruction is received.

Optionally, the trigger instruction may trigger one reporting moment, or may also trigger a plurality of reporting moments, which is not limited in the present disclosure.

For example, as shown in FIG. 4*a*, the trigger instruction n indicates that three specified moments for reporting the predicted CSI are triggered.

In step 43: the predicted channel state information (CSI) is sent to the network device at the first feedback moment.

It should be noted that for the specific content and implementation manner of step 43, reference may be made to the descriptions of other embodiments of the present disclosure, which will not be repeated here.

By implementing the embodiments of the present disclosure, the terminal device may first receive the first indication message, then determine the first feedback moment according to the first indication information, and send the predicted channel state information (CSI) to the network device at the first feedback moment. Therefore, by sending the predicted CSI to the network device in advance, the situation that the CSI fed back by the terminal device is not available due to the transmission delay is avoided, thereby not only ensuring the validity and reliability of data transmission between the terminal device and the network device, but also reducing waste of resources.

Reference is made to FIG. 5, which is a schematic flowchart of a method for channel state feedback provided by an embodiment of the present disclosure, and the method is executed by a terminal device. As shown in FIG. 5, the method may include but not limited to the following steps.

In step 51: first indication information is received, where the first indication information is used for indicating a first feedback moment t and delay information k.

And t and k are both positive numbers.

It should be noted that for the specific content and implementation manner of step 51, reference may be made to the descriptions of other embodiments of the present disclosure, which will not be repeated here.

In step 52: the predicted CSI at the moment t+k is determined according to the first indication information.

Optionally, the terminal device may predict the CSI at the moment t+k according to a channel measurement result in a first time period before the moment t.

The first time period may be a time period with a fixed or variable length and pre-configured by the terminal device, or may be a first time period before the first feedback moment determined by the terminal according to received indication information from the network device.

In step 53: at the moment t, the predicted CSI at the moment t+k is sent to the network device.

It can be understood that the terminal device sends the predicted CSI at the moment t+k to the network device at the moment t, thus ensuring that the predicted CSI received by the network device at the moment t+k is available CSI, and avoiding the situation that the CSI corresponding to the moment t sent by the terminal device is unavailable due to the transmission delay.

By implementing the embodiments of the present disclosure, after receiving the first indication information, the terminal device can determine the predicted CSI at the moment t+k according to the delay information k and the first feedback moment t indicated in the first indication information, and finally at the moment t, the terminal device sends the predicted CSI at the moment t+k to the network device. Therefore, by sending the predicted CSI considering the delay information to the network device, the situation that the CSI fed back by the terminal device is not available due to the transmission delay is avoided, thereby not only ensuring the validity and reliability of data transmission between the terminal device and the network device, but also reducing waste of resources.

Reference is made to FIG. 6, which is a schematic flowchart of a method for channel state feedback provided by an embodiment of the present disclosure, and the method is executed by a terminal device. As shown in FIG. 6, the method may include but not limited to the following steps.

In step 61: first indication information is received, where the first indication information is used for indicating a first feedback moment t and delay information k.

In step 62: predicted CSI from a moment t+k−m to a moment t+k is determined according to the first indication information.

And m may be a time length corresponding to the predicted CSI, and t, k, and m are all positive numbers.

Optionally, if m is a value greater than k, the terminal device may use the average CSI measured from the moment t+k−m to the moment t as the predicted CSI from the moment t+k−m to the moment t+k.

In step 63: at the moment t, the predicted CSI from the moment t+k−m to the moment t+k is sent to the network device.

It can be understood that the terminal device sends the predicted CSI from the moment t+k−m to the moment t+k to the network device at the moment t, which avoids the situation that the CSI corresponding to the moment t sent by the terminal device is unavailable due to transmission delay.

It should be noted that for the specific content and implementation manner of step 62 and step 63, reference may be made to the descriptions of other embodiments of the present disclosure, which will not be repeated here.

By implementing the embodiments of the present disclosure, the terminal device can first receive the first indication information, and then determine the predicted CSI from the moment t+k−m to the moment t+k according to the delay information k and the first feedback moment t indicated by the first indication information, finally, at the moment t, the terminal device sends the predicted CSI from the moment t+k−m to the moment t+k to the network device. Therefore, by sending the predicted CSI considering the delay information to the network device, the situation that the CSI fed back by the terminal device is not available due to the transmission delay is avoided, thereby not only ensuring the validity and reliability of data transmission between the terminal device and the network device, but also reducing waste of resources.

Reference is made to FIG. 7, which is a schematic flowchart of a method for channel state feedback provided by an embodiment of the present disclosure, and the method is executed by a network device. As shown in FIG. 7, the method may include but not limited to the following steps.

In step 71: at a first feedback moment, predicted channel state information (CSI) sent by the terminal device is received.

The predicted CSI is the CSI predicted by the terminal device at a certain moment in the future or within a certain period of time in the future.

Optionally, the network device may determine the first feedback moment according to the agreement.

For example, the agreement stipulates that: the first feedback moment is the moment t, then the terminal device will feed back the predicted CSI to the network device at the moment t, and the network device will receive the predicted CSI sent by the terminal device at the moment t.

It can be understood that in the present disclosure, considering the long transmission distance in the satellite communication system, the network device can receive the predicted CSI sent by the network device in advance, so as to ensure that the CSI received by the network device is available as much as possible, thereby ensuring reliable transmission of communication.

By implementing the embodiments of the present disclosure, the network device receives the predicted channel state information (CSI) sent by the terminal device at the first feedback moment. Therefore, by receiving the predicted CSI sent by the terminal device in advance, the situation that the CSI fed back by the terminal device is not available due to the transmission delay is avoided, thereby not only ensuring the validity and reliability of data transmission between the terminal device and the network device, but also reducing waste of resources.

Reference is made to FIG. 8, which is a schematic flowchart of a method for channel state feedback provided by an embodiment of the present disclosure, and the method is executed by a network device. As shown in FIG. 8, the method may include but not limited to the following steps.

In step 81: first indication information is sent, where the first indication information is used for indicating a first feedback moment.

Optionally, the first indication information may include at least one of the following: a number of reporting of CSI: a reporting cycle of CSI: a reporting moment of CSI; or delay information.

Optionally, the first indication information may be a radio resource control (RRC) message. The Radio Resource Control (RRC) message is sent by the network device to the terminal device, and is used for indicating the first feedback moment.

Optionally, the first indication information may also be a medium access control (MAC) control element (CE). The Medium Access Control (MAC) Control Element (CE) is sent by the network device to the terminal device, and is used for indicating the first feedback moment.

Optionally, the first indication information may also be downlink control information (DCI). The Downlink Control Information (DCI) is sent by the network device to the terminal device, and is used for indicating the first feedback moment.

In step 82: at the first feedback moment, the predicted channel state information (CSI) sent by the terminal device is received.

Optionally, the network device may receive the predicted CSI at the moment t+k sent by the terminal device at the first feedback moment t.

And k is delay information, and both t and k are positive numbers.

Optionally, the delay information k may be absolute delay information, or may be relative delay information. For example, the delay information indicated in the first indication information is k milliseconds, that is, when the terminal device sends information to the network device, the existing delay is k milliseconds. Alternatively, the first indication information may also indicate that the delay information is: n milliseconds later than the reporting moment, etc., which is not limited in the present disclosure.

Optionally, the network device may also receive the predicted CSI from the moment t+k−m to the moment t+k sent by the terminal device at the first feedback moment t.

And m may be a time length corresponding to the predicted CSI, and t, k, and m are all positive numbers.

The predicted CSI from the moment t+k−m to the moment t+k may be: in the case that m is greater than k, the average channel state information measured by the terminal device from the moment t+k−m to the moment t.

By implementing the embodiments of the present disclosure, the network device may send the first indication information for indicating the first feedback moment to the terminal device, and then receive the predicted channel state information (CSI) sent by the terminal device at the first feedback moment. Therefore, by receiving the predicted CSI sent by the terminal device in advance, the situation that the CSI fed back by the terminal device is not available due to the transmission delay is avoided, thereby not only ensuring the validity and reliability of data transmission between the terminal device and the network device, but also reducing waste of resources.

Figure 9:
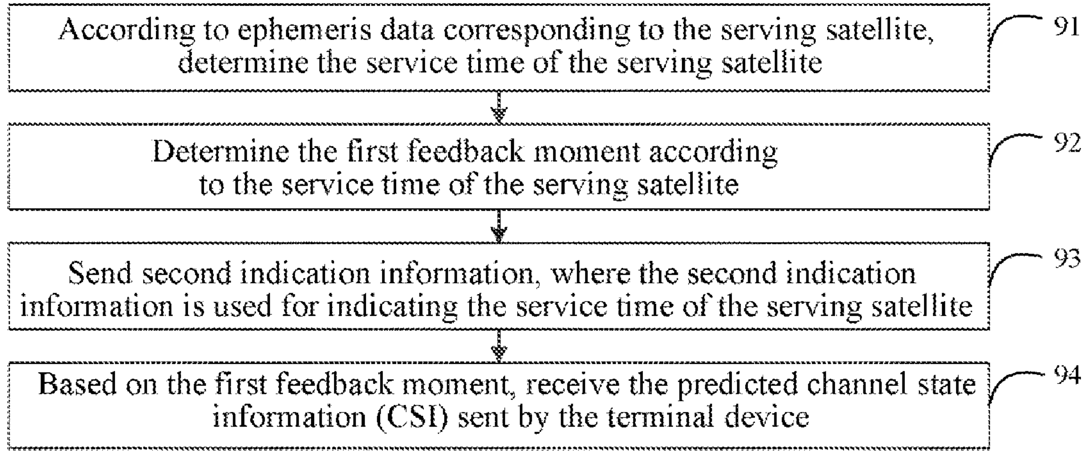
FIG. 9 is a schematic flowchart of a method for channel state feedback provided by another embodiment of the present disclosure.

Reference is made to FIG. 9, which is a schematic flowchart of a method for channel state feedback provided by an embodiment of the present disclosure, and the method is executed by a network device. As shown in FIG. 9, the method may include but not limited to the following steps.

In step 91: according to ephemeris data corresponding to a serving satellite, a service time of the serving satellite is determined.

Optionally, the service time of the serving satellite may be a moment, a time period, or a remaining service time, or the like when the serving satellite provides effective services for the terminal device.

The ephemeris data of the serving satellite may include position and velocity data of the serving satellite. According to the ephemeris data of the satellite, the network device can determine the position of the satellite at each moment, and then determine the service time of the service satellite based on the position of the satellite at each moment.

In step 92: the first feedback moment is determined according to the service time of the serving satellite.

In the present disclosure, the network device determines the first feedback moment according to the service time of the serving satellite. Therefore, it is ensured that within the service time of the serving satellite, the predicted CSI can be sent to the network device through the serving satellite.

It should be noted that there may be one or more first feedback moments, which is not limited in the present disclosure.

In step 93: second indication information is sent, where the second indication information is used for indicating the service time of the serving satellite.

The network device may first send the second indication information to the terminal device, and then the terminal device determines the feedback information according to the service time of the serving satellite indicated by the second indication information. In this way, the terminal device sends the predicted CSI to the network device by using the first feedback moment of the network device, further reducing waste of resources.

It should be noted that step 92 may be performed first, and then step 93 may be performed, or step 93 may be performed first, and then step 92 is performed, and so on, which are not limited in the present disclosure.

In step 94: at the first feedback moment, the predicted channel state information (CSI) sent by the terminal device is received.

It should be noted that for the specific content and implementation manner of step 94, reference may be made to the descriptions of other embodiments of the present disclosure, which will not be repeated here.

By implementing the embodiments of the present disclosure, the network device can first determine the service time of the serving satellite according to the ephemeris data corresponding to the serving satellite, then determine the first feedback moment according to the service time of the serving satellite, and then send the second indication information for indicating the service time of the serving satellite to the terminal device, and finally receive the predicted channel state information (CSI) sent by the terminal device at the first feedback moment. Therefore, by receiving the predicted CSI sent by the terminal device in advance, the situation that the CSI fed back by the terminal device is not available due to the transmission delay is avoided, thereby not only ensuring the validity and reliability of data transmission between the terminal device and the network device, but also reducing waste of resources.

In the above embodiments provided in the present disclosure, the methods provided in the embodiments of the present disclosure are introduced from the perspectives of network device and terminal device respectively. In order to implement the various functions in the method provided by the above embodiments of the present disclosure, the network device and the terminal device may include a hardware structure and a software module, and the above functions are implemented in the form of a hardware structure, a software module, or a hardware structure plus a software module. Some of the above-mentioned functions may be implemented in the form of a hardware structure, a software module, or a hardware structure plus a software module.

Figure 10:
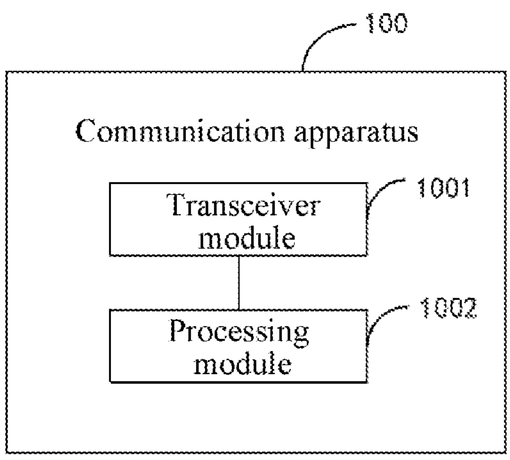
FIG. 10 is a schematic structural diagram of a communication apparatus according to an embodiment of the present disclosure.

Reference is made to FIG. 10, which is a schematic structural diagram of a communication apparatus 100 provided by an embodiment of the present disclosure. The communication apparatus 100 shown in FIG. 10 may include a processing module 1001 and a transceiver module 1002.

The transceiver module 1002 may include a sending module and/or a receiving module, the sending module is used to realize the sending function, the receiving module is used to realize the receiving function, and the transceiver module 1002 can realize the sending function and/or the receiving function.

It can be understood that the communication apparatus 100 may be a terminal device, may also be an apparatus in the terminal device, and may also be an apparatus that can be matched and used with the terminal device.

The communication apparatus 100 is on the terminal device, and the apparatus includes:

a transceiver module, configured to send predicted channel state information (CSI) to the network device at a first feedback moment.

Optionally, the Apparatus Also Includes:

a processing module 1001, configured to determine the first feedback moment according to a service time of a serving satellite;

or, the processing module 1001 is further configured to determine the first feedback moment according to first indication information.

Optionally, the Processing Module 1001 is Also Specifically Configured to:

determine the service time of the service satellite according to ephemeris data corresponding to the service satellite;

or, determine the service time of the serving satellite according to second indication information.

Optionally, the first indication information includes delay information k, and the transceiver module 1002 is specifically configured to:

determine the predicted CSI at a moment t+k, where t is the first feedback moment, and t and k are positive numbers;

at a moment t, send the predicted CSI at the moment t+k to the network device.

Optionally, the first indication information includes delay information k, and the transceiver module is specifically configured to:

determine the predicted CSI from a moment t+k−m to a moment t+k, where t is the first feedback moment, m is a time length corresponding to the predicted CSI, and t, k, and m are positive numbers;

at the moment t, send the predicted CSI from the moment t+k−m to the moment t+k to the network device.

Optionally, the first indication information is configuration information, and the processing module 1001 is specifically configured to:

determine the first feedback moment according to the number of reporting, the reporting cycle, the reporting moment and/or the delay information of CSI indicated by the configuration information.

Optionally, the first indication information is a trigger instruction, and the processing module 1001 is specifically configured to:

receive configuration information, where the configuration information is used for indicating the number of reporting, the reporting cycle, the reporting moment and/or the delay information of CSI;

determine the first feedback moment according to a receiving moment of the trigger instruction and the number of reporting, the reporting cycle, the reporting moment and/or the delay information indicated by the configuration information.

Optionally, the Transceiver Module 1002 is Also Specifically Configured to:

receive a radio resource control (RRC) message, where the RRC message includes the first indication information;

or, receive a medium access control (MAC) control element (CE), where the MAC CE includes the first indication information;

or, receive downlink control information (DCI), where the DCI includes the first indication information.

Optionally, the Processing Module 1001 is Also Specifically Configured to:

determine the predicted CSI based on a channel measurement result in a first time period before the first feedback moment.

In the communication apparatus provided in the present disclosure, the terminal device can send the predicted channel state information (CSI) to the network device at the first feedback moment. Therefore, by sending the predicted CSI to the network device in advance, the situation that the CSI fed back by the terminal device is not available due to the transmission delay is avoided, thereby not only ensuring the validity and reliability of data transmission between the terminal device and the network device, but also reducing waste of resources.

It can be understood that the communication apparatus 100 may be a network device, an apparatus in the network device, or an apparatus that can be matched and used with the network device.

The communication apparatus 100 is on the network device, the apparatus includes:

a transceiver module 1002, configured to receive predicted channel state information (CSI) sent by the terminal device at a first feedback moment.

Optionally, the apparatus also includes:

a processing module 1001, configured to determine the first feedback moment according to a service time of a serving satellite;

or, the processing module 1001 is configured to determine the first feedback moment according to an agreement.

Optionally, the transceiver module 1002 is also specifically configured to:

send first indication information, where the first indication information is used for indicating the first feedback moment.

Optionally, the first indication information includes delay information k, and the transceiver module is specifically configured to:

at the first feedback moment t, receive the predicted CSI at the moment t+k sent by the terminal device;

or, at the first feedback moment t, receive the predicted CSI from the moment t+k−m to the moment t+k sent by the terminal device;

where m is a time length corresponding to the predicted CSI, and t, k and m are positive numbers.

Optionally, the first indication information includes at least one of the following: the number of reporting of CSI:

a reporting cycle of CSI;

a reporting moment of CSI: or delay information.

Optionally, the Transceiver Module 1002 is Specifically Configured to:

send a radio resource control (RRC) message, where the RRC message includes the first indication information;

or, send a media access control (MAC) control element (CE), where the MAC CE includes the first indication information;

or, send downlink control information (DCI), where the DCI includes the first indication information.

Optionally, the Processing Module 1001 is Also Specifically Configured to:

determine the service time of the service satellite according to ephemeris data corresponding to the service satellite.

Optionally, the Transceiver Module 1002 is Also Specifically Configured to:

send second indication information, where the second indication information is used for indicating the service time of the serving satellite.

In the communication apparatus provided by the present disclosure, the network device receives the predicted channel state information (CSI) sent by the terminal device at the first feedback moment. Therefore, by receiving the predicted CSI sent by the terminal device in advance, the situation that the CSI fed back by the terminal device is not available due to the transmission delay is avoided, thereby not only ensuring the validity and reliability of data transmission between the terminal device and the network device, but also reducing waste of resources.

Figure 11:
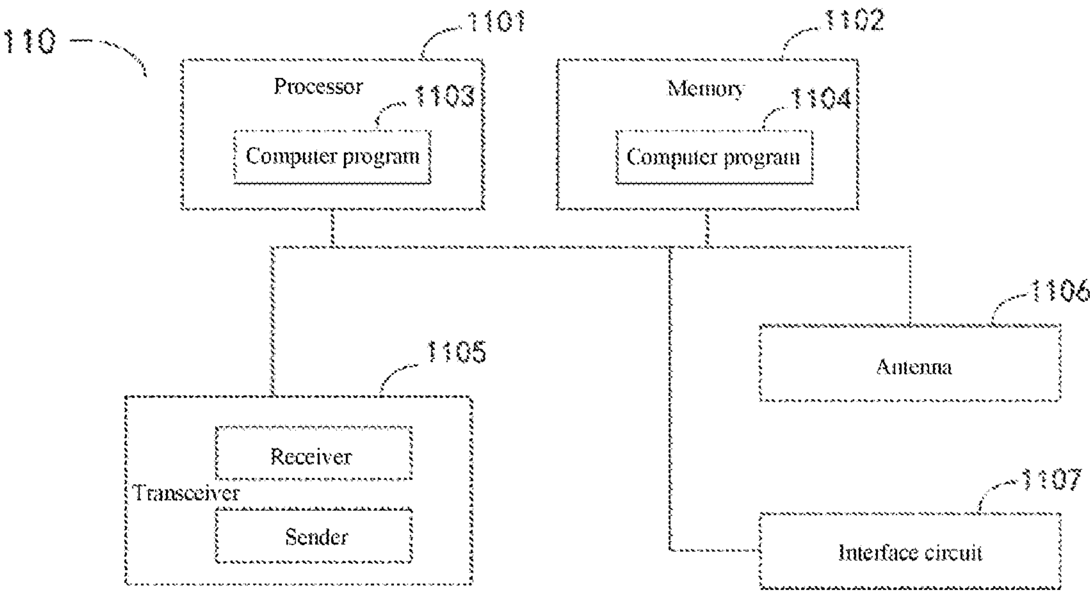
FIG. 11 is a schematic structural diagram of a communication apparatus according to another embodiment of the present disclosure.

Reference is made to FIG. 11, which is a schematic structural diagram of another communication apparatus 110 provided by an embodiment of the present disclosure. The communication apparatus 110 may be a network device, or a terminal device, or a chip, a chip system, or a processor that supports the network device to implement the above method, or a chip, a chip system, or a processor that supports the terminal device to implement the above method, etc. The apparatus can be used to implement the methods described in the above method embodiments, and for details, the descriptions in the above method embodiments may be referred to.

The communication apparatus 110 may include one or more processors 1101. The processor 1101 may be a general-purpose processor or a special-purpose processor. For example, it can be a baseband processor or a central processing unit. The baseband processor can be used to process the communication protocol and the communication data, and the central processing unit can be used to control the communication apparatus (such as the base station, the baseband chip, the terminal device, the terminal device chip, DU or CU, etc.), execute a computer program, and process data of the computer program.

Optionally, the communication apparatus 110 may further include one or more memories 1102, on which a computer program 1104 may be stored, and the processor 1101 executes the computer program 1104, so that the communication apparatus 110 executes the method described in the foregoing method embodiments. Optionally, data may also be stored in the memory 1102. The communication apparatus 110 and the memory 1102 can be set separately or integrated together.

Optionally, the communication apparatus 110 may further include a transceiver 1105 and an antenna 1106. The transceiver 1105 may be called a transceiver unit, a transceiver, or a transceiver circuit, etc., and is used to implement a transceiver function. The transceiver 1105 may include a receiver and a sender, and the receiver may be called a receiving machine or a receiving circuit, etc., for realizing a receiving function: the sender may be called a sending machine, or a sending circuit, etc., for realizing a sending function.

Optionally, the communication apparatus 110 may further include one or more interface circuits 1107. The interface circuit 1107 is used to receive code instructions and transmit them to the processor 1101. The processor 1101 runs the code instructions to enable the communication apparatus 110 to execute the methods described in the foregoing method embodiments.

The communication apparatus 110 is a terminal device: the processor 1101 is configured to execute step 31 in the figure: step 42 in FIG. 4: step 52 in FIG. 5: or step 62 in FIG. 6. The transceiver 1105 is used to execute step 21 in FIG. 2: step 32 in FIG. 3: step 41 and step 43 in FIG. 4: step 51 and step 53 in FIG. 5: or step 61 and step 63 in FIG. 6.

The communication apparatus 110 is a network device: the processor 1101 is used to execute step 91 in FIG. 9; or step 92 in FIG. 9: the transceiver 1105 is used to execute step 71 in FIG. 7: step 81 and step 82 in FIG. 8: or step 93 and step 94 in FIG. 9.

In an implementation manner, the processor 1101 may include a transceiver for implementing receiving and sending functions. For example, the transceiver may be a transceiver circuit, or an interface, or an interface circuit. The transceiver circuits, interfaces or interface circuits for realizing the functions of receiving and sending can be separated or integrated together. The above-mentioned transceiver circuit, interface or interface circuit may be used for reading and writing code/data, or the above-mentioned transceiver circuit, interface or interface circuit may be used for signal transmission or transfer.

In an implementation manner, the processor 1101 may store a computer program 1103, and the computer program 1103 runs on the processor 1101 to enable the communication apparatus 110 to execute the methods described in the foregoing method embodiments. The computer program 1103 may be solidified in the processor 1101, and in this case, the processor 1101 may be implemented by hardware.

In an implementation manner, the communication apparatus 110 may include a circuit, and the circuit may implement the function of sending or receiving or communicating in the foregoing method embodiments. The processors and transceivers described in the present disclosure can be implemented on the integrated circuit (IC), the analog IC, the radio frequency integrated circuit (RFIC), the mixed signal IC, the application specific integrated circuit (ASIC), the printed circuit board (PCB), the electronic equipment, etc. The processor and transceiver can also be fabricated using various IC process technologies, such as complementary metal oxide semiconductor (CMOS), nMetal-oxide-semiconductor (NMOS), P-type Metal oxide semiconductor (positive channel metal oxide semiconductor, PMOS), bipolar junction transistor (BJT), bipolar CMOS (BiCMOS), silicon germanium (SiGe), gallium arsenide (GaAs), etc.

The communication apparatus described in the above embodiments may be a network device or a terminal device, but the scope of the communication apparatus described in the present disclosure is not limited thereto, and the structure of the communication apparatus may not be limited by FIG. 11. The communication apparatus may be a stand-alone device or may be part of a relatively large device. For example, the communication apparatus may be:

(1) a stand-alone integrated circuit (IC), or a chip, or a chip system or a subsystem;

(2) a set having one or more ICs, optionally, the set of ICs may also include a storage component for storing data and computer programs;

(3) ASIC, such as a Modem;

(4) a module that can be embedded in other devices;

(5) a receiver, a terminal device, an intelligent terminal device, a cellular phone, a wireless equipment, a handset, a mobile unit, a vehicle equipment, a network device, a cloud equipment, an artificial intelligence equipment, etc.;

(6) others and so on.

Figure 12:
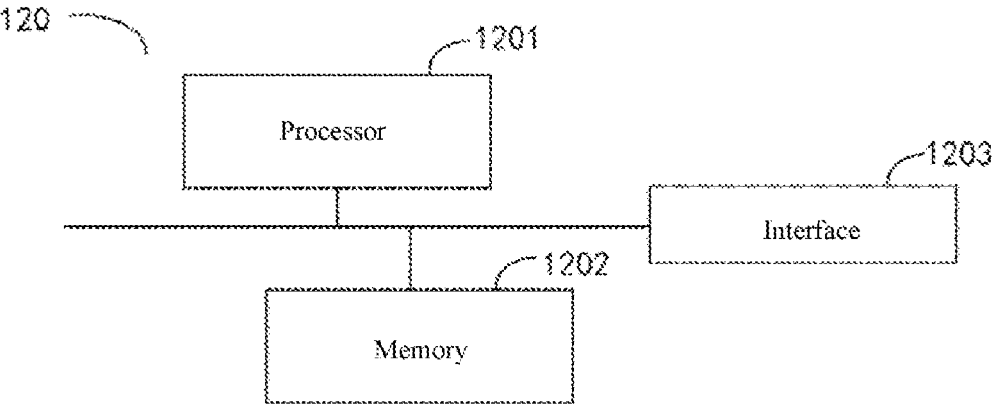
FIG. 12 is a schematic structural diagram of a chip according to an embodiment of the present disclosure.

For the case where the communication apparatus may be a chip or a chip system, the schematic structural diagram of the chip shown in FIG. 12 may be referred to. The chip shown in FIG. 12 includes a processor 1201 and an interface 1202. The number of the processors 1201 may be one or more, and the number of the interfaces 1202 may be more than one.

For the case where the chip is used to implement the functions of the terminal device in the embodiments of the present disclosure:

the interface 1202 is configured to execute step 41 in FIG. 4: step 51 in FIG. 5; or step 61 in FIG. 6.

For the case where the chip is used to implement the functions of the network device in the embodiments of the present disclosure:

the interface 1202 is configured to execute step 71 in FIG. 7: step 82 in FIG. 8; or step 94 in FIG. 9.

Optionally, the chip further includes a memory 1203 for storing necessary computer programs and data.

Those skilled in the art can also understand that various illustrative logical blocks and steps listed in the embodiments of the present disclosure can be implemented by electronic hardware, computer software, or a combination of both. Whether such functions are implemented by hardware or software depends on the specific application and overall system design requirements. Those skilled in the art may use various methods to implement the described functions for each specific application, but such implementation should not be understood as going beyond the protection scope of the embodiments of the present disclosure.

The embodiment of the present disclosure also provides a communication system, the system includes the communication apparatus as the terminal device and the communication apparatus as the network device in the aforementioned embodiment of FIG. 11, or the system includes the communication apparatus as the terminal device and the communication apparatus as the network device in the aforementioned embodiment FIG. 12.

The present disclosure also provides a computer-readable storage medium on which instructions are stored, and when the instructions are executed by a computer, the functions of any one of the above method embodiments are realized.

The present disclosure also provides a computer program product, which implements the functions of any one of the above method embodiments when the computer program product is executed by a computer.

In the above embodiments, all or part of them may be implemented by software, hardware, firmware or any combination thereof. When implemented using software, it may be implemented in whole or in part in the form of the computer program product. The computer program product includes one or more computer programs. When the computer program is loaded and executed on the computer, all or part of the processes or functions according to the embodiments of the present disclosure may be generated. The computer can be a general purpose computer, a special purpose computer, a computer network, or other programmable apparatuses. The computer program can be stored in the computer-readable storage medium or transmitted from one computer-readable storage medium to another computer-readable storage medium, for example, the computer program can be transmitted from one website, computer, server or data center to another website site, computer, server or data center by wired (such as coaxial cable, optical fiber, digital subscriber line (DSL)) or wireless (such as infrared, wireless, microwave, etc.) manner. The computer-readable storage medium may be any available medium that can be accessed by a computer, or a data storage device such as a server or a data center integrated with one or more available media. The available medium may be a magnetic medium (for example, a floppy disk, a hard disk, a magnetic tape), an optical medium (for example, a high-density digital video disc (DVD)), or a semiconductor medium (for example, a solid state disk (SSD)), etc.

Those of ordinary skill in the art can understand that the first, second, and other numerical numbers involved in the present disclosure are only for convenience of description and distinguishing, and are not used to limit the scope of the embodiments of the present disclosure, nor to indicate the order.

At least one in the present disclosure can also be described as one or more, and a plurality of may be two, three, four or more, which is not limited by the present disclosure. In the embodiments of the present disclosure, for a technical feature, the technical features in this technical feature are distinguished by "first", "second", "third", "A", "B", "C" and "D", etc., and the technical features described by "first", "second", "third", "A", "B", "C" and "D" have no sequence or order.

The corresponding relationship shown in each table in the present disclosure may be configured or predefined. The values of the information in each table are just examples, and may be configured as other values, which are not limited in the present disclosure. When configuring the corresponding relationship between the information and each parameter, it is not necessarily required to configure all the corresponding relationships shown in the tables. For example, in the table in the present disclosure, the corresponding relationship shown in some rows may not be configured. For another example, appropriate deformation adjustments can be made based on the above table, for example, splitting, merging, and so on. The names of the parameters shown in the titles of the above tables may also adopt other names understandable by the communication apparatus, and the values or representations of the parameters may also be other values or representations understandable by the communication apparatus. When the above tables are implemented, other data structures can also be used, for example, arrays, queues, containers, stacks, linear tables, pointers, linked lists, trees, graphs, structures, classes, heaps, hashed tables or hash tables or the like can be used.

The predefinition in the present disclosure can be understood as definition, definition in advance, storage, prestorage, prenegotiation, preconfiguration, curing, or prefiring.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Skilled artisans may implement the described function using different methods for each particular application, but such implementation should not be considered going beyond the scope of the present disclosure.

Those skilled in the art can clearly understand that for the convenience and brevity of the description, the specific working process of the above-described system, apparatus and unit can refer to the corresponding process in the foregoing method embodiments, which will not be repeated here.

The above is only the specific implementation of the present disclosure, and the scope of protection of the present disclosure is not limited thereto. Anyone skilled in the art can easily think of changes or substitutions within the technical scope of the present disclosure, which should fall within the protection scope of the present disclosure. Therefore, the protection scope of the present disclosure should be determined by the protection scope of the claims.

What is claimed is:

1. A method for channel state feedback, wherein the method is performed by a terminal device, and comprises:

sending predicted channel state information (CSI) to a network device at a first feedback moment;

wherein the method further comprises:

determining the first feedback moment according to first indication information;

wherein the first indication information comprises delay information k, and sending the predicted CSI to the network device at the first feedback moment further comprises:

determining predicted CSI at a moment t+k, wherein t is the first feedback moment, and t and k are positive numbers; and at the moment t, sending the predicted CSI at the moment t+k to the network device; or determining predicted CSI from a moment t+k−m to a moment t+k, wherein t is the first feedback moment, m is a time length corresponding to the predicted CSI, and t, k, and m are positive numbers; and at the moment t, sending the predicted CSI from the moment t+k−m to the moment t+k to the network device.

2. The method according to claim 1, wherein the first indication information is configuration information, and determining the first feedback moment according to the first indication information comprises:

determining the first feedback moment according to a number of reporting, a reporting cycle, and at least one of a reporting moment or delay information of the CSI indicated by the configuration information.

3. The method according to claim 1, wherein the first indication information is a trigger instruction, and determining the first feedback moment according to the first indication information comprises:

receiving configuration information, wherein the configuration information indicates a number of reporting, a reporting cycle, and at least one of a reporting moment and/or or delay information of the CSI; and determining the first feedback moment according to a receiving moment of the trigger instruction and the number of reporting, the reporting cycle, and the at least one of the reporting moment or the delay information indicated by the configuration information.

4. The method according to claim 1, further comprising one of:

receiving a radio resource control (RRC) message, wherein the RRC message comprises the first indication information;

receiving a medium access control (MAC) control element (CE), wherein the MAC CE comprises the first indication information; or receiving downlink control information (DCI), wherein the DCI comprises the first indication information.

5. The method according to claim 1, further comprising:

determining the predicted CSI based on a channel measurement result in a first time period before the first feedback moment.

6. A method for channel state feedback, wherein the method is performed by a network device, and comprises:

receiving predicted channel state information (CSI) sent by a terminal device at a first feedback moment;

wherein the method further comprises:

determining the first feedback moment according to an agreement; and sending first indication information; wherein the first indication information indicates the first feedback moment and comprises delay information k, and receiving the predicted CSI sent by the terminal device at the first feedback moment comprises one of:

at the first feedback moment t, receiving predicted CSI at a moment t+k sent by the terminal device; or at the first feedback moment t, receiving predicted CSI from a moment t+k−m to the moment t+k sent by the terminal device, wherein m is a time length corresponding to the predicted CSI, and t, k and m are positive numbers.

7. The method according to claim 6, wherein the first indication information comprises at least one of:

a number of reporting of the CSI;

a reporting cycle of the CSI;

a reporting moment of the CSI; or delay information.

8. The method according to claim 6, further comprising one of:

sending a radio resource control (RRC) message, wherein the RRC message comprises the first indication information;

sending a medium access control (MAC) control element (CE), wherein the MAC CE comprises the first indication information; or sending downlink control information (DCI), wherein the DCI comprises the first indication information.

9. A terminal device, comprising:

a processor; and a memory storing a computer program executable by the processor, wherein the processor is configured to send predicted channel state information (CSI) to a network device at a first feedback moment;

wherein the processor is further configured to:

determine the first feedback moment according to first indication information; wherein the first indication information comprises delay information k, and the processor is further configured to:

determine predicted CSI at a moment t+k, wherein t is the first feedback moment, and t and k are positive numbers; and at the moment t, send the predicted CSI at the moment t+k to the network device; or determine predicted CSI from a moment t+k−m to a moment t+k, wherein t is the first feedback moment, m is a time length corresponding to the predicted CSI, and t, k, and m are positive numbers; and at the moment t, send the predicted CSI from the moment t+k−m to the moment t+k to the network device.

10. A network device, comprising:

a processor; and a memory storing a computer program executable by the processor, wherein the processor is configured to perform the method according to claim 6.

* * * * *